United States Patent [19]

Yoo et al.

[11] Patent Number: 4,511,709
[45] Date of Patent: Apr. 16, 1985

[54] WHOLLY AROMATIC OR ALIPHATIC AROMATIC BLOCK COPOLYAMIDES AND PROCESS THEREFOR

[75] Inventors: Han S. Yoon; Wha S. Lee, both of Seoul, Rep. of Korea

[73] Assignee: Korea Advanced Institute of Science and Technology, Seoul, Rep. of Korea

[21] Appl. No.: 466,616

[22] Filed: Feb. 15, 1983

Related U.S. Application Data

[62] Division of Ser. No. 313,166, Oct. 20, 1981, abandoned.

[51] Int. Cl.³ .............................................. C08G 69/12
[52] U.S. Cl. .................................... 528/331; 528/207; 528/208; 528/312; 528/313; 528/314; 528/315; 528/319; 528/335; 528/336; 528/347; 528/348
[58] Field of Search ............... 528/331, 347, 348, 207, 528/208, 312, 313, 314, 315, 319, 335, 336

[56] References Cited

U.S. PATENT DOCUMENTS

| | | | |
|---|---|---|---|
| 3,770,704 | 11/1973 | Dobinson | 260/78 R |
| 4,169,932 | 10/1979 | Sokolov et al. | 528/336 |
| 4,308,374 | 12/1981 | Vollbracht et al. | 528/336 |
| 4,309,531 | 1/1982 | Kyritsos et al. | 528/331 |

FOREIGN PATENT DOCUMENTS

86595 11/1975 Japan.
28395 3/1979 Japan.

*Primary Examiner*—Harold D. Anderson
*Attorney, Agent, or Firm*—Holman & Stern

[57] ABSTRACT

High molecular weight block copolyamides useful in the production of fibers of high strength and modulus, having the following formula:

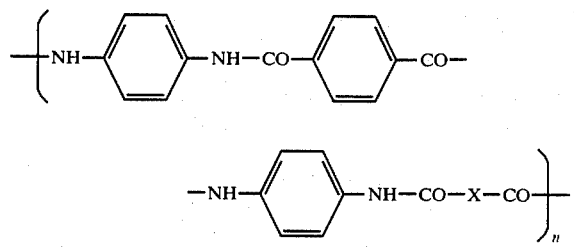

wherein X is $-(CH_2)_m-$, wherein m is 0 to 12,

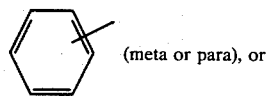 (meta or para), or

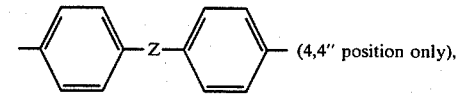 (4,4" position only), wherein Z is $C(CH_3)_2$, zero, oxygen or $SO_2$, are prepared from N,N'-bis(4-aminophenyl) terephthalamide having the formula:

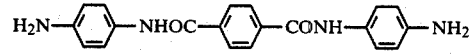

which is itself prepared by condensing aniline with dimethyl terephthalate or terephthalic acid, nitrating the product produced thereby and finally hydrogenating the resultant compound.

10 Claims, No Drawings

WHOLLY AROMATIC OR ALIPHATIC AROMATIC BLOCK COPOLYAMIDES AND PROCESS THEREFOR

This is a divisional of application Ser. No. 313,166, filed Oct. 20, 1981, abandoned.

FIELD OF THE INVENTION

This invention relates to a series of wholly aromatic or aromatic aliphatic copolyamides, and more particularly relates to a high molecular weight block copolyamide consisting essentially of recurring units of the formula:

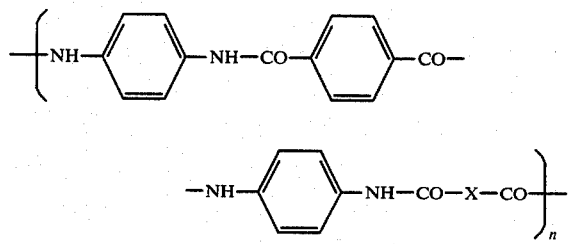

wherein X is $(CH_2)_m$, wherein m is 0 to 12,

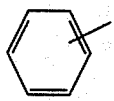

(meta or para), or

(4,4″ position only), wherein Z is $C(CH_3)_2$, zero, oxygen or $SO_2$, which is useful for the production of fibers having high strength and modulus.

BACKGROUND OF THE INVENTION

Various kinds of aromatic copolyamides or aromatic aliphatic copolyamides, disclosed in the prior art are known to be random copolyamides which have no regular block unit sequence in their molecular structure, since all of them are prepared from the mixture of more than two kinds of diamines or diacidhalides ("*Aramid Fiber,*" Kirk-Othmer Encyclopedia of Chemical Technology, 3rd ed., vol. 3,213–242 (1978), John Wiley & Sons, Inc.). Therefore, it is clear that with any of the conventional art, the polymers having a regular unit sequence of molecular structures can not be made.

This invention is based on a successful synthesis of an extremely pure pre-polymer, N,N′-bis(4-aminophenyl)-terephthalamide, having the following structure.

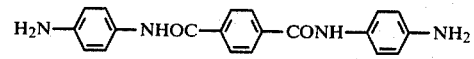

The aromatic diamine (Compound I) is a "polymer block" of poly(p-phenylene)terephthalamide and can be prepared from aniline and dimethyl terephthalate by sequence of organic synthesis, such as, condensation, nitration and hydrogenation.

This important object of the invention, therefore, is to provide various kinds of wholly aromatic or aliphatic aromatic block copolyamides which have an absolutely regular block unit sequence in the skeleton thereof.

Another object of the invention is to provide N,N′-bis(4-aminophenyl)terephthalamide which is used as a polymer block in preparing the polyamides of the invention.

Still another object of the invention is to provide a process for preparing the polyamides and the polymer block.

These and other objects and advantages of the invention will be more apparent by the description hereinafter without deviating from the true scope of the invention.

SUMMARY OF THE INVENTION

In summary, the present invention substantially starts from the preparation of N,N′-bis(4-aminophenyl)-terephthalamide having the formula:

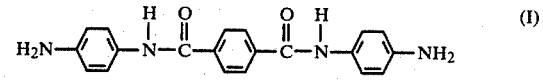

which is useful as a polymer block (i.e. prepolymer block) for preparing the number of novel block (i.e. prepolymer block) copolymers having the formula:

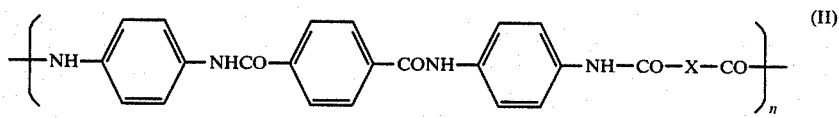

In the invention, the definition, "polymer block," does not indicate a "block polymer" in the common sense of polymerization techniques, but a unit polymer from which high molecular weight block copolymers are constituted.

According to the present invention, the process for preparing the polymer block, i.e., Compound I, comprises condensing aniline with dimethyl terephthalate or terephthalic acid at a range of temperature of from 170° to 200° C. in the presence of alkali or alkali earth metal; nitrating the resultant at a range of temperature of from 0° to 5° C. with a mixed acid; and then hydrogenating the resultant in the presence of a reduction catalyst at a range of temperature of from 80° to 130° C. under hydrogen pressure of 500 to 800 lbs/inch² in an organic solvent.

Alkali or alkali earth metals, for the condensation of the first step, include sodium, potassium, calcium, barium, or the like. It is preferable to use an excess of aniline, which may be recycled to the subsequent step. Immediately after the condensation reaction has been completed, N,N′-bisphenylterephthalamide is produced in the form of a suspension of fine crystalline precipitate from the excessive aniline solvent. The solubility of N,N'-bisphenylterephthalamide in aniline solvent is very low even at an elevated temperature of around 200° C. During the formation of N,N'-bisphenylterephthalamide, an equimolar amount of methanol is distilled out. The completion of the distillation of methanol indicates the termination of the formation of N,N'-bisphenylterephthalamide, which can easily be isolated from the reaction mixture by cooling, filtering, and washing the resulting precipitate with methanol.

The N,N'-bisphenylterephthalamide thus obtained is subsequently subjected to a nitration reaction by adding a mixed acid solution ($H_2SO_4/HNO_3=1:1$) to a suspension solution in concentrated $H_2SO_4$ of the above compound at a temperature of $-5°$ to $5°$ C., giving N,N'-bis(4-nitrophenyl)terephthalamide. This nitro compound can be separated and purified from the reaction mixture by pouring it into ice water, followed by filtration and recrystallization. The use of dimethylformamide and dimethylacetamide as a recrystallization solvent is desirable. It should be noted that by properly controlling nitration conditions, such as reaction temperatures, the amount of nitric acid and sulfuric acid and so forth, a para-oriented dinitro compound can be obtained with about a 97% or more yield. The resulting dinitro compound is finally subject to catalytic hydrogenation by a conventional method, to yield the desired compound, N,N'-bis(4-aminophenyl)terephthalamide, which was previously defined as a "polymer block" compound. As a hydrogenation solvent, dimethylacetamide or hexamethylphosphoramide may preferably be used. Hydrogenation conditions, such as hydrogen pressure, reaction temperatures, and total amount of hydrogen supplied should be carefully controlled, so that over-hydrogenation cannot proceed. Preferably, hydrogen pressure within a range of from 200 to 500 lbs/inch$^2$, and a temperature within a range of from 90° to 110° C. are used. Under these conditions, the reaction requires a 4–7 hour period. After completion of hydrogenation, the final product is filtered from the catalyst slurry at about 100° C., cooled to precipitate, and then recrystallized two times from dimethylacetamide. Alternatively, the hydrogenation may be carried out by heating the dinitro compound at 90°–100° C. in an aqueous $FeCl_2$ solution containing Fe and 35% HCl. In this alternative method, the final product is neutralized with sodium carbonate, and then extracted from an amide solution.

Of course, according to the invention, the dinitro compound may be prepared from nitroaniline and terephthaloylchloride.

The process described above can be summarized into the following reaction sequence:

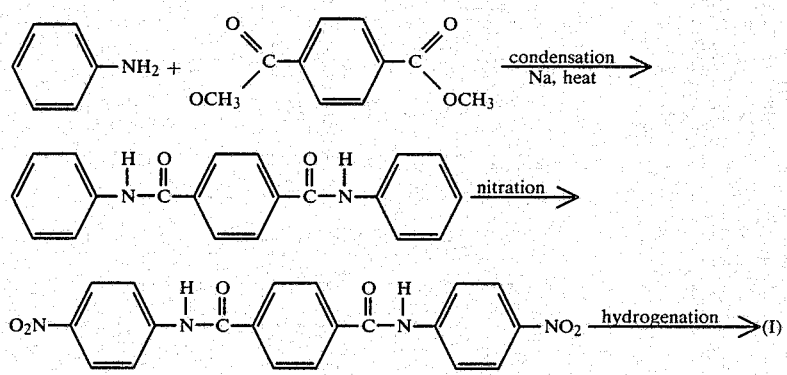

According to the invention described above, the N,N'-bis(4-aminophenyl)terephthalamide thus prepared is employed as a precursor material for preparing various kinds of block copolymers. For an example of a poly(p-phenyleneterephthalamide) polymer (Compound IV shown below), hereinafter referred to simply as "polymer," this polyamide can be prepared by reacting N,N'-bis(4-aminophenyl)terephthalamide with terephthaloylchloride in an equimolar ratio in an organic amide solvent containing an inorganic metal chloride, using pyridine as a reaction promotor. The inorganic metal chloride includes lithium chloride or calcium chloride, and the organic amide solvent may be a mixture of 1:2 hexamethylphosphoramide and N-methylpyrrolidone, or N-methylpyrrolidone or N,N'-dimethylacetamide alone.

N,N'-bis(4-aminophenyl)terephthalamide can also be used as an intermediate for deriving therefrom many kinds of novel block copolymers, which have a highly regular sequence of repeated polymer blocks in the polymer skeleton thereof.

Such block copolymers are prepared by copolymerizing N,N'-bis(4-aminophenyl)terephthalamide with diacid halides, in an amide solvent containing a metal halide and pyridine. The representatives of these block copolymers are set forth below:

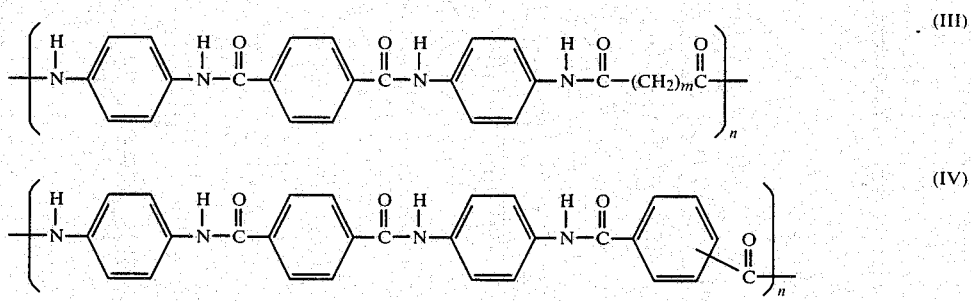

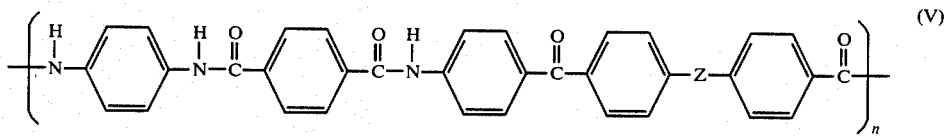

Z = C(CH₃)₂, zero, oxygen or SO₂.

The examples of the acid halides include adipyl chloride; sebacyl chloride, cyclohexane-1,4-dicarbonyl chloride; 1,4-phenylenediacetyl chloride; cyclobutane-1,3-dicarbonyl chloride; terephthaloyl bromide; isophthaloyl chloride; 2,5-dichloro-terephthaloyl chloride; 5-chloroisophthaloyl chloride; 5-tertiary butylisophthaloyl chloride; bibenzoyl chloride; diphenic acid chloride, sulfonyl dibenzoyl chloride; 2,6-naphthalenedicarbonyl chloride; 1,4-naphthalenecarbonyl chloride; 2,6-pyridinedicarbonyl chloride; oxalyl chloride; oxalyl bromide; fumaryl chloride; and fumaryl bromide.

In performing the copolymerization, the selection of the amide solvent is most important. Suitable amide solvents are hexamethylphosphoramide; 2-methylpyrrolidone; dimethylacetamide; pyridine; and N,N,N',N'-tetramethylurea. N,N,N',N'-tetramethylurea, hexamethylphosphoramide, N,N-dimethylacetamide, N-methylpyrrolidone-2, and a combination thereof, such as, for example, a mixture of hexmethylphosphoramide and N-methylpyrrolidone-2 are preferred.

In order to obtain a stable solution of the polymer block in an amide solvent at a temperature of about 0° C., a small amount of lithium salt or calcium halide is added to the amide solvent. The suitable amount is less than 2% by weight based on the solvent. Lithium chloride is preferred. Essentially, about 7% pyridine should be admixed with a solution of the polymer block in the solvent, to compensate for the bad effects of the metal halide on the degree of copolymerization.

The polymerization rate is very fast and therefore, the reaction mixture consisting of terephthaloylchloride and the polyamide should be stirred vigorously immediately after being admixed.

It is possible to separate the polymeric product from the reaction mixture by known conventional means after the copolymerization is terminated. It takes from a few hours to one night to obtain the proper degree of polymerization.

The block copolymers also have a very exact alternative sequence of building blocks. These copolymers, therefore, have quite different physical characteristics from those of the conventional random copolymers. In other words, it should be noted that copolymer [IV] of the invention is prepared from the polymer block [I]. However, the concepts of the conventional prior art polymers do not apply because of clear differences of the unit building block of the polymer molecule. Therefore, the polymers of the invention are distinctive from prior art polymers in their crystallinity, transition temperature, heat-resistance, and the like. These block copolymers have a softening point ranging from 350° to 650° C. or higher. Therefore, fibers or filaments obtained from these high molecular weight copolymers are useful in their application articles requiring high modulus, high tenacity, and heat-resistance, such as tire cords, electrical insulators, reinforcing plastic composites, and so forth.

PREFERRED EMBODIMENTS OF THE INVENTION

The following non-limiting examples are illustrative of the practice of the preferred embodiments of the invention. In these examples, inherent viscosity ($\eta inh$) has been determined in accordance with the following equation:

$$\eta_{inh} = \frac{\ln (\eta rel)}{C}$$

wherein ($\eta rel$) represents the relative viscosity; and C represents a concentration of 0.5 gram of the polymer in 100 ml. of the solvent. The relative viscosity ($\eta rel$) is determined by dividing the flow time, in a capillary viscometer, of a dilute solution of the polymer by the flow time for pure solvent. The dilute solution used herein for determining ($\eta rel$) is of the concentration expressed by (C) above. Flow times are determined at 30° C., using concentrated (97%) sulfuric acid as a solvent. An inherent viscosity of more than 4.0 is usually required for preparation of high tenacity and high modulus fibers.

EXAMPLE 1

(a) Preparation of N,N'-bisphenylterephthalamide

Into a 1,000 ml., three necked, round bottom flask equipped with a stirrer, a thermometer, and a condenser, were placed 400 grs. (4.3 moles) of aniline oil, 97 grs. (0.5 mole) of dimethylterephthalate, and 0.5 gr. of metal sodium. The temperature of the mixture was raised slowly, while stirring, to 186° C. During the releasing of methanol through the condenser, a fine pale yellowish precipitate was formed. This temperature was maintained for about 3 hours until a predetermined amount of methanol was distilled out. After completing the reaction, the resultant mixture was cooled down to 5° C. to give a great deal of precipitate, which was subsequently separated by filtration, washed with methanol, and dried. The resulting product was obtained in the amount of 151.4 grs. (95.8% of theoretical value), and it did not melt at around 300° C., but sublimated at 310° C. The IR spectrum showed carbonyl absorption at 1,650 cm$^{-1}$ and an amide stretch at 3,300 cm$^{-1}$. Solvents suitable for NMR analysis of this compound have not been found.

(b) Preparation of N,N'-bis(4-nitrophenyl)terephthalamide;

(i) From N,N'-bisphenyl terephthalamide

In a 500 ml., three necked, round bottom flask equipped with a thermometer, a stirrer, and a dropping funnel, 20 grs. (0.0633 mole) of N,N'-bisphenylterephthalamide, prepared in Procedure (a) above, was dissolved in 150 grs. of 97% sulfuric acid at 30° C. While maintaining the temperature of the mixture below 5° C. with an ice bath, a mixed acid (97% H₂SO₄=11.4 grs.;

70% HNO₃=11.4 grs.) was very slowly added to the mixture through the funnel for nitration. During this time, the reaction mixture was stirred vigorously. After the addition of the mixed acid, the ice bath was removed and the temperature was allowed to rise to room temperature. Thereafter, the reaction mixture was poured into ice water. The resulting precipitate was collected and then recrystallized from dimethylacetamide, giving the desired compound. Yield: 25.0 grs. (97.4% of theoretical value).

(ii) From p-nitroaniline and terephthaloylchloride

Into a 500 ml., three necked, round bottom flask equipped with a thermometer, a stirrer, and a condenser, were placed 167 ml. of hexamethylphosphoramide (dehydrated with CaH₂) and 27.62 grs. of p-nitroaniline (0.2 mole; m.p. 153°–154° C.). By stirring the mixture, a solution was formed. The flask was then cooled to 0° C. with an ice bath. Keeping the temperature below 2° C., 20.3 grs. (0.1 mole) of terephthaloylchloride were added to the mixture in small portions over a period of about 2 hours. After the addition was finished, the ice bath was removed and the reaction mixture was left standing until it had reached room temperature. Precipitation occurred in about 4 to 6 hours. Thereafter, the precipitate was collected by filtration, washed with methanol, and recrystallized twice from dimethylacetamide.

The N,N'-bis(4-nitrophenyl)terephthalamide prepared by either Procedure (i) or (ii) melted at 369° to 371° C. The IR spectrum showed carbonyl absorption at 1,670 cm⁻¹, and an amide stretch at 3,350 cm⁻¹.

(c) Preparation of N,N'-bis(4-aminophenyl)terephthalamide

Into a 300 ml. pressure-vessel of stainless steel equipped with a magnetic stirrer, a thermometer, and a hydrogen inlet tube, were placed 145 ml. of dimethylacetamide, 18 grs. of N,N'-bis(4-nitrophenyl)terephthalamide prepared in Procedure (b-ii) above, and 2 grs. of Raney nickel. While stirring the contents of the vessel, the temperature was slowly raised to 100° C. Hydrogen gas of about 600 psi was introduced to the bottom of the vessel via the hydrogen inlet tube. The above hydrogen pressure and reaction temperature were maintained for about 5 to 6 hours, so that the hydrogenation reaction could be completed. The reaction product was filtered at 100° C. to separate the Raney nickel catalyst therefrom, and cooled down to 5° C. The resulting yellowish precipitate was collected by filtration and recrystallized from the dimethylacetamide solvent to afford the titled compound in the form of beautiful needle-shaped pale yellow crystals. Yield: 15.32 grs. (97.7% of theoretical value); m.p.: 300° C. (dec.). The IR spectrum showed carbonyl absorption at 1,660 cm⁻¹, and an amide stretch at 3,300 cm⁻¹ (asym); 3,325 cm⁻¹ (sym). For the NMR analysis of the compound, deuterated dimethylsulfoxide solvent was used. The chemical shift of each portion in the NMR spectra was found to be as follows:

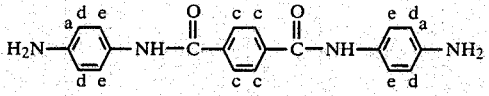

| Chemical Shift (ppm) | a | b | c | d | e |
|---|---|---|---|---|---|
| | 4.90 | 9.96 | 8.04 | 7.45 | 6.60 |

As a result of the elemental analysis, the compound was identified to have the formula $C_{20}H_{18}N_4O_2$.

Anal. calcd. for $C_{20}H_{18}N_4O_2$: C,69.37(%); H,5.31(%); N,16.18(%) Found: C,69.24(%); H,5,23(%); N,16.24(%).

EXAMPLE 2

Preparation of a block copolyamide,

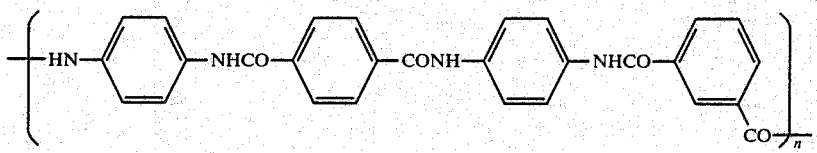

Into a 300 ml., four necked, round bottom flask equipped with a stirrer, a thermometer, and nitrogen inlet and outlet tubes, were placed 21 ml. of hexamethylphosphoramide (dehydrated with CaH₂), 42 ml. of N-methylpyrrolidone (dehydrated with CaH₂), 1.2 grs. of lithium chloride, 4.01 grs. (1.1821×10⁻² mol) of N,N'-bis(4-aminophenyl)terephthalamide, and 2 ml. of pyridine solvent. The mixture was heated to 50° C. to dissolve the solid materials in the solvent and cooled down to 0° C. While stirring the solution vigorously at this temperature, 2.4 grs. (1.183×10⁻² mol) of isophthaloylchloride were rapidly added. A few minutes after the addition, the reaction mixture turned to gel. After letting the reaction mixture stand overnight, the resulting polymer was separated from the solvent using a knife-blender followed by washing with water. The polymer, dried in a vacuum oven, gave a theoretical yield. Inherent viscosity of the polymer was 3.51.

EXAMPLE 3

Preparation of a block copolyamide,

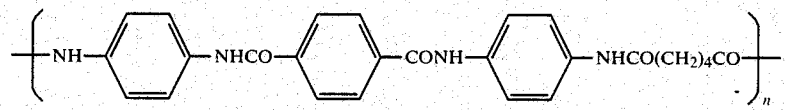

Into a 300 ml., four necked, round bottom flask equipped with a stirrer, a thermometer, and nitrogen inlet and outlet tubes, were placed 21 ml. of hexamethylphosphoramide (dehydrated with CaH₂), 42 ml. of N-methylpyrrolidone (dehydrated with CaH₂), 1.2 grs. of lithium chloride, 4.01 grs. (1.1821×10⁻² mol) of N,N'-bis(4-aminophenyl)terephthalamide, and 2 ml. of pyridine solvent. The mixture was heated to 50° C. to dissolve the solid materials in the solvent and cooled down to 0° C. While stirring the solution vigorously at this temperature, 2.16 grs. (1.1823×10$^{-2}$ mol) of adipolychloride were rapidly added. A few minutes after the addition, the reaction mixture turned to a viscous state. After letting the reaction mixture stand overnight, the resulting polymer was separated from the solvent using a knife-blender and then washed with water. The polymer, dried in a vacuum oven, gave a theoretical yield. Inherent viscosity of the polymer was 4.32.

EXAMPLE 4

Preparation of a block copolyamide,

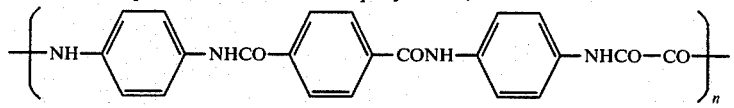

Into a 300 ml., four necked, round bottom flask equipped with a stirrer, a thermometer, and nitrogen inlet and outlet tubes, were placed 21 ml. of hexamethylphosphoramide (dehydrated with CaH$_2$), 41 ml. of N-methylpyrrolidone (dehydrated with CaH$_2$), 1.2 grs. of lithium chloride, 4.01 grs. (1.1821×10$^{-2}$ mol) of N,N'-bis(4-aminophenyl)terephthalamide, and 2 ml. of pyridine solvent. The mixture was heated to 50° C. While stirring the solution vigorously at this temperature, 2.8 grs. (1.1823×10$^{-2}$ mol) of sebacoylchloride were rapidly added. A few minutes after the addition, the reaction mixture turned to a viscous state. After letting the reaction mixture stand overnight, the resulting polymer was separated from the solvent using a knife-blender, and then washed with water. The polymer, dried in a vacuum oven, gave a theoretical yield. Inherent viscosity of the polymer was 3.48.

EXAMPLE 5

Preparation of a block copolyamide,

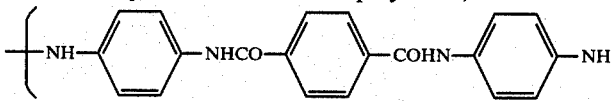

Into a 300 ml., four necked, round bottom flask equipped with a stirrer, a thermometer, and nitrogen inlet and outlet tubes, were placed 60 ml. of dimethylacetamide (dehydrated with CaH$_2$), 1.2 grs. of lithium chloride, 4.01 grs. (1.1821×10$^{-2}$ mol) of N,N'-bis(4-aminophenyl)terephthalamide, and 2 ml. of pyridine solvent. The mixture was heated to 50° C. to dissolve the solid materials in the solvent and cooled down to 0° C. While stirring the solution vigorously at this temperature, 2.4 grs. (1.1823×10$^{-2}$ mol) of terephthaloylchloride were rapidly added. A few minutes after the addition, the reaction mixture became rapidly viscous. After letting the reaction mixture stand overnight, the resulting polymer was separated from the solvent using a knife-blender, and then washed with water. The polymer, dried in a vacuum oven, gave a theoretical yield. Inherent viscosity of the polymer was 4.84.

What is claimed is:

1. A fiber or filament forming block copolymer consisting essentially of the recurrent units:

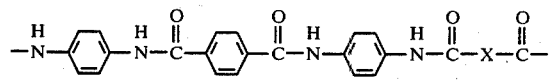

wherein said block copolymer has a softening point greater than 350° C. and

X is selected from one of the group consisting of —(CH$_2$)$_m$ wherein m is 4, 6, 8 or 10

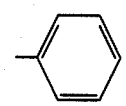

substituted in the meta or para position, or

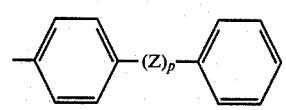

wherein Z is C(CH$_3$)$_2$, oxygen, or SO$_2$ and p is 0 or 1.

2. The copolymer of claim 1 consisting of said recurrent units.

3. The block copolymer of claim 2 where X is (CH$_2$)$_m$ and where m is 4, 6, 8 or 10.

4. The block copolymer of claim 2 where X is

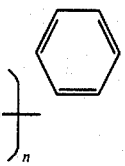

substituted in the meta position.

5. The block copolymer of claim 2 where X is

substituted in the para position.

6. The block copolymer of claim 2 where X is

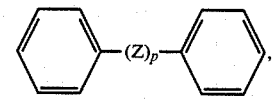

where Z is C(CH$_3$)$_2$, oxygen, or SO$_2$ and p is 0 or 1.

7. The block copolymer of claim 6 where p is 0.

8. The block copolymer of claim 6 where Z is C(CH$_3$)$_2$ and p is 1.

9. The block copolymer of claim 6 where Z is oxygen and p is 1.

10. The block copolymer of claim 6 where Z is SO$_2$ and p is 1.

* * * * *